Nov. 6, 1956  B. DENZLER  2,769,643
COLLET CHUCKS
Filed April 26, 1954   2 Sheets-Sheet 1

INVENTOR.
BERTHOLD DENZLER,
BY Max R. Kraus
Attorney.

Nov. 6, 1956
B. DENZLER
2,769,643
COLLET CHUCKS
Filed April 26, 1954
2 Sheets-Sheet 2
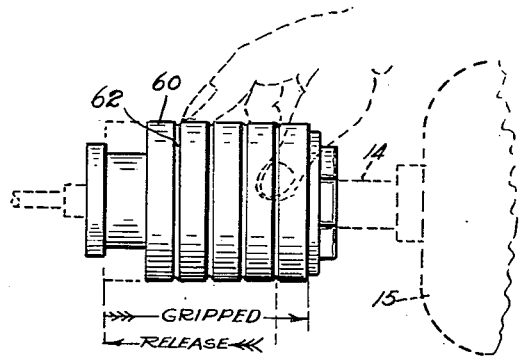
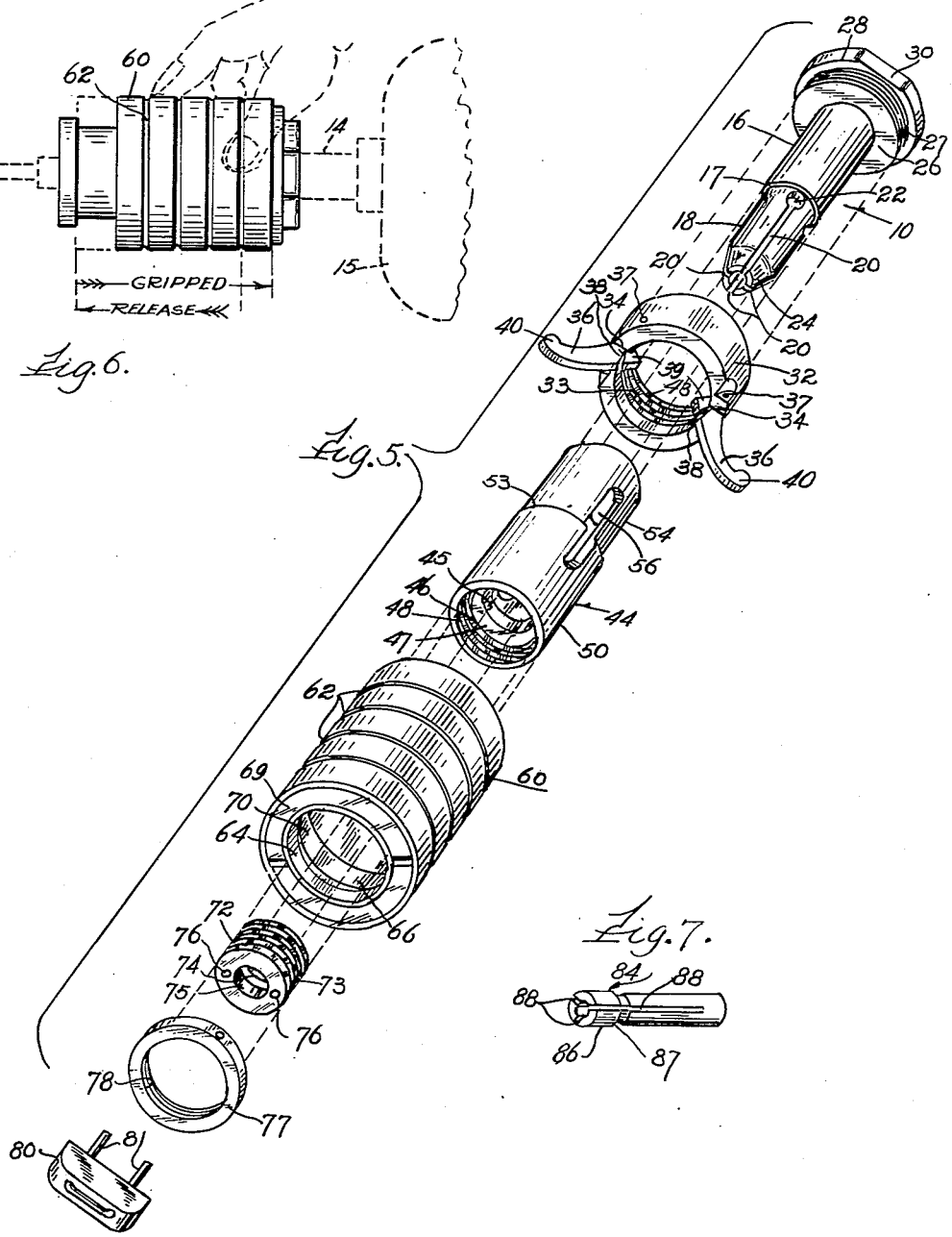
INVENTOR.
BERTHOLD DENZLER.
BY May R. Kraus
Attorney.

United States Patent Office 2,769,643
Patented Nov. 6, 1956

2,769,643

COLLET CHUCKS

Berthold Denzler, Chicago, Ill., assignor to Davos Products Co., Chicago, Ill., a partnership Application April 26, 1954, Serial No. 425,385

6 Claims. (Cl. 279—50)

This invention relates to improvements in chucks, particularly to a collet chuck.

One of the objects of this invention is to provide a collet chuck in which the collet and tool or work piece may be released and removed therefrom and another tool or work piece and/or collet inserted and gripped while the chuck continues rotating at high speed.

Another object is to provide a collet chuck which utilizes no springs, which has a minimum number of parts, which is inexpensive to manufacture and assemble and which is highly efficient in operation.

Another object of this invention is to provide a collet chuck which is adjustable to compensate for wear and meet varied conditions of operation.

Other objects will become apparent as this description progresses.

In the drawings:

Fig. 5 is an exploded perspective view of the parts.

Fig. 6 is an elevational view of the chuck attached to a motor showing the gripping and releasing positions, and Fig. 7 is a perspective view of a collet.

Figures 1, 2:
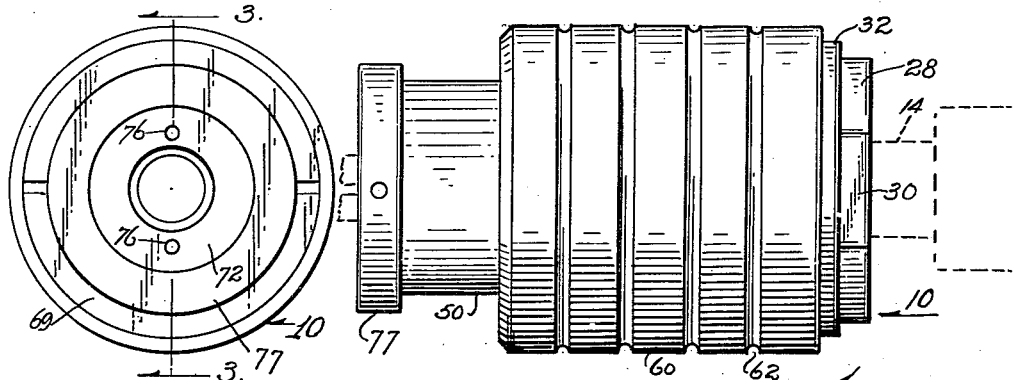
Fig. 1 is an end view of my chuck.
Fig. 2 is a side view thereof.

Referring to the drawings the numeral 10 generally designates a chuck body having a cylindrical stem 16 provided with a shoulder 17 and a reduced stem portion 18. The chuck body and stem have a tapered axial bore 12 provided with an annular shoulder 13 to receive the driving shaft 14 of the lathe or motor 15 on which the chuck is secured. The tapered bore may be made of any size to fit any individual smooth or threaded shaft. The reduced stem 18 has 4 equally spaced longitudinal slots 20 each communicating at the inner ends thereof with a circular opening 22. The reduced stem 18 is tapered at the front thereof as at 24 to provide a tapered nose. The stem 18 has an internal bore 21 communicating with bore 12. Bore 21 forms the collet receiving socket.

The body 10 has an enlarged annular rearward portion 26 which is peripherally threaded as at 27 and which has an enlarged annular head or disc 28 defining a shoulder portion 29. The head 28 had a pair of opposed flat portions 30 for gripping by a suitable instrument.

Supported on the body 10 is a lever ring 32 which is internally threaded as at 33 to engage the threads 27 on the portion 26. The forward portion of the lever ring 32 is provided with a pair of diametrically opposed slots 34. A pair of levers 36, each lever being received in the slot 34 is pivotally mounted on pins 37 secured to the lever ring 32. The levers each have an inverted V-shaped cutout or slot 38 which extends from the outer end to the pivot pin 37. The slotted levers provide a spring action which equalizes the pressure and compensates for wear of the parts. It also permits the collet to firmly grip tools of various sizes and tolerances. The lever 36 has a heel portion 39 which is tapered outwardly and has a front upturned mounted terminal portion 40. The lever ring 32 has an annular ring portion 42 adjacent the front thereof which defines a shoulder 43.

Slidable axially on the stem 16–18 of the body 10 is a draw sleeve generally indicated at 44 having an internal bore 45 which is enlarged as at 46 at the forward end thereof and which defines an annular shoulder 47. The bore 46 is internally threaded at 48. The outside forward half of the sleeve is enlarged circumferentially as at 50 to define a shoulder 53 between it and the rear outside circumferential surface 54.

The sleeve 44 has a pair of diametrically opposed longitudinal slots 56 which receive the levers 36. The heels 39 of the levers engage the rear walls 57 of the slots 56.

A clutch sleeve 60 is rotatably and axially supported on the slotted draw sleeve 44 and said clutch sleeve has a plurality of spaced grooves 62 to facilitate hand gripping. The clutch sleeve 60 has an internal annular rib 64. Secured within the forward end of clutch sleeve 60 is a bushing 66 having a shoulder 67 resting against the rib 64. The forward end of the bushing is externally threaded as at 68 to receive a threaded retaining ring 69 which locks the bushing to the clutch sleeve 60. The bushing 66 has a circumferentially tapered rear surface 70 and an additional circumferential tapered surface 71 adjacent thereto which cooperates with the rounded ends of the levers 36. The taper 70 is approximately 27° and the taper 71 is approximately a 6° taper. The bushing forms an integral parts of the clutch sleeve 60 and is rotatable in said sleeve and is axially supported on the slotted draw sleeve 44. By providing two tapers of the character shown it is possible to accommodate oversize and undersize tools or work pieces in the collet.

An end cap 72 which is externally threaded at 73 is threadedly secured to the threaded portion of the draw sleeve 44. The end cap has an internally circumferentially tapered portion 74 adapted to engage the tapered nose 24 of the stem or spindle 16–18. The cap has an annular opening 75 at the front thereof. The face of the cap has a pair of spaced openings 76 adapted to be engaged by an adjusting wrench to be described.

Figure 3:
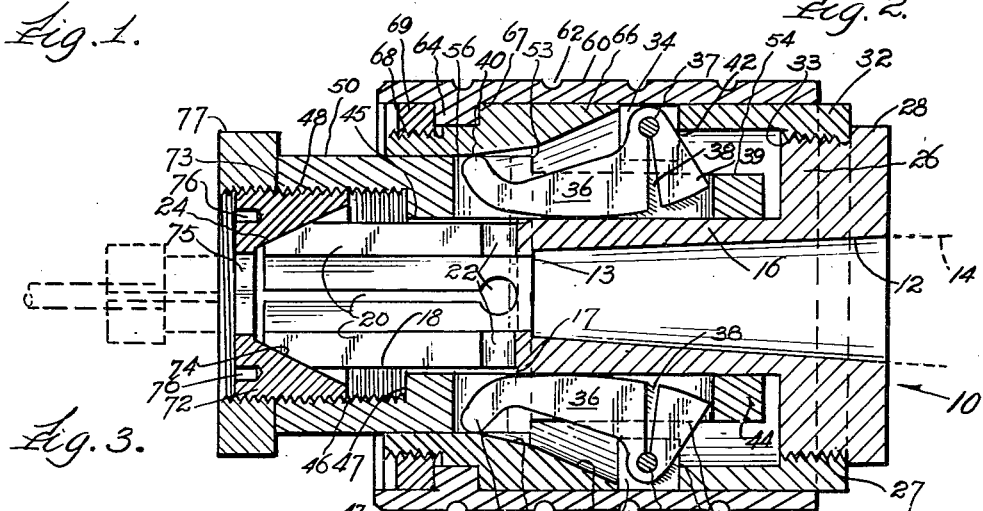
Fig. 3 is a cross sectional view taken on line 3—3 of Fig. 1.

A lock nut or ring 77 internally threaded as at 78 threadedly engages the cap 72. The lock nut will be engaged by the bushing 66 when the clutch sleeve is in its forward position to limit the forward sliding movement of the clutch sleeve. The rearward sliding movement of the clutch sleeve (Fig. 3) is arrested when the rear of the bushing strikes the forward end of the ring lever 32.

At the front end of Fig. 5 is shown the adjusting wrench 80 which has a pair of pins 81 for engagement with the pin holes 76 on the end cap 72. By rotating the cap clockwise as viewed in Fig. 1 the cap is threaded to move inwardly with its tapered surface 74 against the nose 24 of the slotted stem 16–18 to compress the slotted stem. By rotating the stem counterclockwise the cap is moved outwardly or away from the nose of the stem. By such adjustment the bore of the stem is either enlarged or restricted depending on that desired.

One form of collet that may be used with this invention is that shown in perspective in Fig. 6 and is generally designated by the numeral 84. The collet is inserted through the opening 75 in the end cap and is received within the bore 21 of the slotted stem 18. The head 86 of the collet has a shoulder 87 which engages the face of the cap to limit its rearward movement. The collet is rendered radially expansible and contractible by providing a plurality of slots 88 which extend through the head. When the collet is inserted in the stem 18 it is held in gripped position when the sleeve 60 is moved to the rear or to the right as viewed in Figs. 2 and 3 and in ungripped or released position when the sleeve is moved to the front or left as in Fig. 4. The sliding movement of the sleeve 60 may be effected while the chuck is rotating, thus a collet and tool may be inserted and removed without stopping the motor which is driving the chuck.

The operation of the parts will be understood from the foregoing but will be briefly described.

The chuck is attached to a motor or driving shaft of the lathe through the bore 12.

Figure 4:
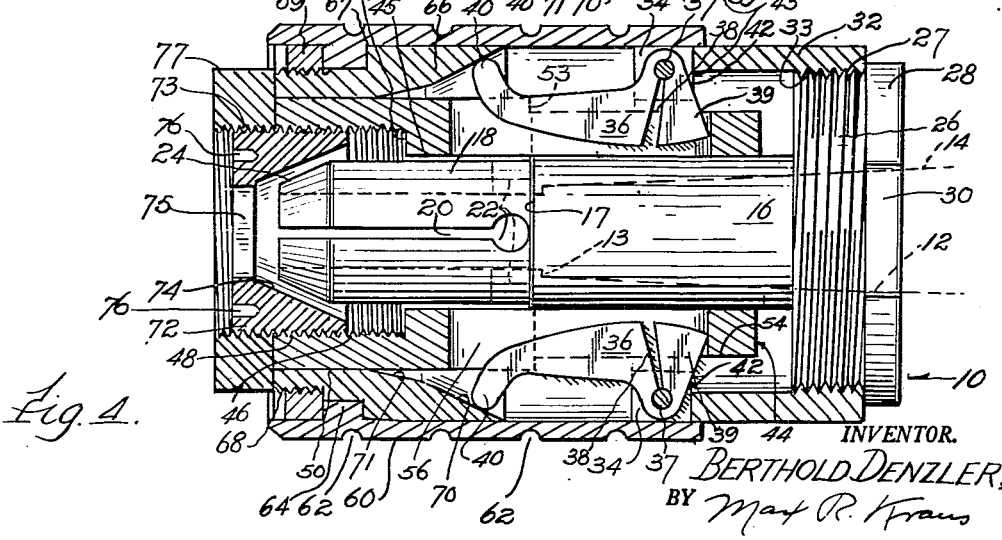
Fig. 4 is a cross sectional view with the parts in position for removal or insertion of the tool.

In ungripping or released position the parts of the chuck are as shown in Fig. 4. The sleeve 60 has been slid to the front of the chuck and with it the tapered bushing 66. The front of the bushing will engage the ring 76 and by doing so will move the end cap 72, and slotted sleeve 44 forwardly or to the left (Fig. 4), thus the rear wall 57 of the slots 56 of the slotted sleeve 44 will strike the heels 39 of the levers 36 and cause them to pivot upwardly and since the tapered bushing 66 has moved forwardly the levers 36 are free to do so. The tapered end cap 72 is then out of engagement with the tapered nose 24 of the slotted stem 18 and thus the slotted stem 18 is in its fully expanded position and capable of receiving the collet 84. In this position the collet and tool may be inserted into the collet receiving bore 21 of the stem 18 and when inserted the clutch sleeve 60 may be moved or slid rearwardly or to the right as shown in Fig. 2.

When the clutch sleeve is slid to the rear the tapered bushing 66 will pivot the levers 36 inwardly and move the slotted sleeve 44 rearwardly. Since the end cap 72 is threaded to the sleeve 44 it moves with it rearwardly and the tapered portion 74 of the end cap engages the nose 24 of the slotted stem and contracts same thus holding and locking the collet therein against removal until the clutch sleeve is again moved forwardly.

It will be understood that various changes and modifications may be made without departing from the spirit and scope of the appended claims.

I claim:

1. A collet chuck comprising a body having a cylindrical slotted stem, said slotted stem having a bore forming a collet receiving socket, a ring member secured to said body and pivotally supporting a plurality of levers, a slotted sleeve axially slidable on said stem with the slots thereof cooperating with said levers, means secured to the front of said slotted sleeve engageable with the nose of said stem, a manually engageable clutch sleeve freely rotatable on said ring and said slotted sleeve and movable axially thereof and adapted when moved forwardly to engage the means on the front of said slotted sleeve and move same away from the nose of said stem to permit expansion of same, and said clutch sleeve when moved rearwardly adapted to pivot said levers to move said slotted sleeve rearwardly and cause the means on the front of the slotted sleeve to contract said slotted stem.

2. A collet chuck comprising a cylindrical stem having a collet receiving socket, a ring secured to said stem to move therewith, said ring supporting a plurality of levers, a slotted sleeve axially slidable on said stem with the slots thereof cooperating with said levers, tapered nose engaging means on the front of said slotted sleeve, a clutch sleeve freely rotatable on said ring and slotted sleeve and axially movable thereon and adapted when axially moved to pivot said levers to move said slotted sleeve and said tapered nose engaging means so that said means engages the nose of said stem to compress same.

3. A collet chuck comprising a body having a cylindrical slotted stem, said stem having a tapered nose and a bore forming a collet receiving socket, a plurality of levers supported on said body, a sleeve axially slidable on said stem, said sleeve having slots cooperating with said levers, nose engaging means secured to the front of said sleeve, a manually engageable clutch sleeve freely rotatable about said body and movable axially thereof to operate said nose engaging means on the sleeve in relation to said tapered nose, said clutch sleeve when moved axially in one direction adapted to move said sleeve and cause said nose engaging means to disengage the nose on the slotted stem and when moved in the opposite direction adapted to pivot said levers to move said sleeve and cause the nose engaging means to engage the nose and contract said nose.

4. A collet chuck including a body having a cylindrical slotted stem, said stem having a tapered nose and a bore forming a collet receiving socket, a ring member secured to said body and pivotally supporting a plurality of levers, a slotted sleeve axially slidable on said stem and cooperating with said levers, a tapered end cap secured to the front of said slotted sleeve and adapted to engage said nose to contract same, a manually engageable clutch sleeve freely rotatable about said ring member and said slotted sleeve and movable axially thereof, said clutch sleeve adapted to cooperate with said end cap to move same in relation to said nose, said clutch sleeve when moved axially in one direction adapted to move said end cap away from said nose and when moved in the opposite direction adapted to pivot said levers to move said sleeve and nose engaging means so that said nose engaging means engages said nose to contract said nose.

5. A collet chuck including a cylindrical stem, said stem being slotted adjacent the front thereof and having a tapered nose, said stem having a continuous bore, the rear of which is secured to a driving member and the front adjacent said nose to receive a collet, a ring member secured around a portion of said stem and supporting a plurality of levers, a sleeve axially slidable on said stem and having a portion thereof positioned between said ring member and said stem, said sleeve having a plurality of slots to receive said levers, a tapered end cap secured to said sleeve to engage said tapered nose to contract same, a manually engageable clutch sleeve freely rotatable on said ring member and said slotted sleeve and movable axially thereof, said clutch sleeve operating said pivoted levers to move said slotted sleeve and said end cap axially in relation to said tapered nose so that said tapered nose is in expanded position.

6. A collet chuck comprising a body having a slotted cylindrical stem, said stem having a bore forming an expandable and contractible collet receiving socket, a ring member secured to said body and pivotally supporting a plurality of levers, a draw sleeve axially slidable on said stem and having means engaging the forward end of said stem to expand and contract same, said draw sleeve having slots cooperating with said levers, a manually engageable sleeve freely rotatable on said ring and draw sleeve and movable axially thereof and adapted when moved rearwardly to pivot said levers which move said draw sleeve rearwardly to contract said collet receiving socket and when moved forwardly to release said socket for expansion.

References Cited in the file of this patent
UNITED STATES PATENTS

| | | |
|---|---|---|
| 2,335,721 | Zagar | Nov. 30, 1943 |
| 2,364,212 | Hines | Dec. 5, 1944 |
| 2,370,729 | Hoppe | Mar. 6, 1945 |
| 2,410,344 | Hines | Oct. 29, 1946 |